(12) United States Patent
Hasse et al.

(10) Patent No.: US 8,494,803 B2
(45) Date of Patent: Jul. 23, 2013

(54) DEVICE FOR TESTING AN ELECTRICAL COMPONENT

(75) Inventors: Dirk Hasse, Paderborn (DE); Peter Scheibelhut, Paderborn (DE); Dirk Bittner, Langenhagen (DE); Robert Polnau, Paderborn (DE)

(73) Assignee: DSpace Digital Signal Processing and Control Engineering GmbH, Paderborn (DE)

( * ) Notice: Subject to any disclaimer, the term of this patent is extended or adjusted under 35 U.S.C. 154(b) by 319 days.

(21) Appl. No.: 12/900,989

(22) Filed: Oct. 8, 2010

(65) Prior Publication Data

US 2011/0087477 A1    Apr. 14, 2011

(30) Foreign Application Priority Data

Oct. 9, 2009    (DE) .................. 10 2009 048 981

(51) Int. Cl.
*G01R 31/00*    (2006.01)
*G01R 31/02*    (2006.01)
*G06F 17/50*    (2006.01)

(52) U.S. Cl.
USPC ............................................ 702/117; 703/13

(58) Field of Classification Search
None
See application file for complete search history.

(56) References Cited

U.S. PATENT DOCUMENTS

| | | | |
|---|---|---|---|
| 7,456,655 | B1 | 11/2008 | Ben Artsi |
| 2002/0163388 | A1 | 11/2002 | Luo |
| 2003/0048150 | A1 | 3/2003 | Clarke et al. |
| 2003/0050771 | A1* | 3/2003 | Grohmann et al. ............. 703/22 |

FOREIGN PATENT DOCUMENTS

WO    WO 2009/095202 A1    8/2009

OTHER PUBLICATIONS

Nabi et al. "An Overview of Hardware-In-the-Loop Testing Systems at Visteon", 2004, Testing and Instrumentation, SP-1871, 12 pages.*
Agilent Technologies, "Reducing Noise in Switching for Test Systems", 2003, Application Note 1441-2, 14 pages.*

* cited by examiner

*Primary Examiner* — Suzanne Lo
(74) *Attorney, Agent, or Firm* — Muncy, Geissler, Olds & Lowe, PLLC

(57) ABSTRACT

A device for testing an electrical component is provided, having a simulation device for generating a simulation signal, a testing device for connecting the electrical component, at least two connecting devices, and a selection device for selecting the connecting device, wherein the simulation device and the testing device can be connected in an electrically conducting manner to at least one of the connecting devices by the selection device and the individual connecting devices differ from one another in at least one electrical property. Thus, a device for testing an electrical component is provided with which in a simple manner the testing accuracy can be increased by minimizing the signal corruption due to a parasitic property of the connecting device.

16 Claims, 1 Drawing Sheet

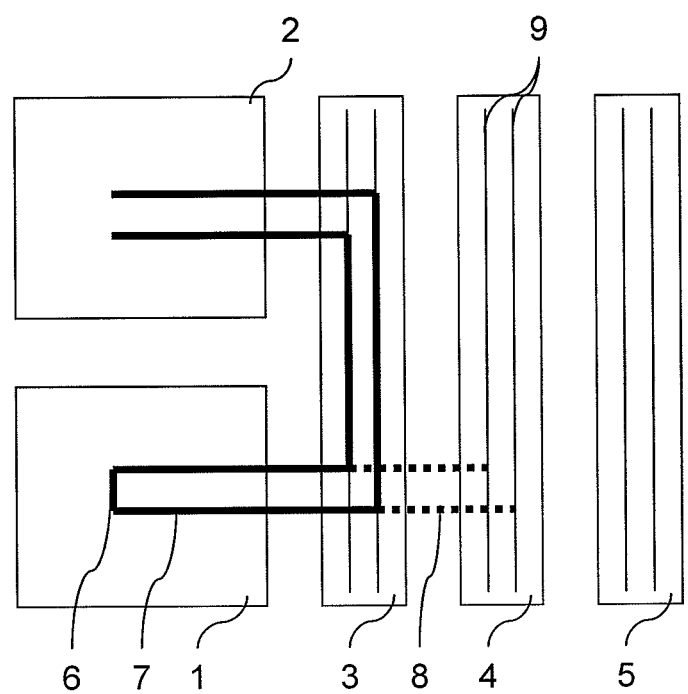

DEVICE FOR TESTING AN ELECTRICAL COMPONENT

This nonprovisional application claims priority under 35 U.S.C. §119(a) to German Patent Application No. DE 10 2009 048 981.9, which was filed in Germany on Oct. 9, 2009, and which is herein incorporated by reference.

BACKGROUND OF THE INVENTION

1. Field of the Invention

The invention relates to a device for testing an electrical component.

2. Description of the Background Art

Devices for testing electrical components, such as, for example, of a control system for a motor vehicle or an automation device, are known from the conventional art and have highly different designs and are used primarily in applied research, industrial development, and in other areas of application, particularly in the fields of mechatronics, automotive applications, in air and space technology, in systems and process engineering, and other technical fields in which process control tasks must be solved in the broadest sense. In this respect, a control system in this context is understood to be a technical device that can be used essentially for the tasks of measuring, control, and/or regulation. In the broadest sense, this generally relates to an electrical, preferably program-controllable system, which is typically called a "control device," particularly in the field of automotive applications. In this respect, a control system is limited not only to the system-theoretical definition of control, but is typically also used for implementation of controls.

Devices of this type known from the conventional art for testing a control system frequently can have a simulation device for generating, measuring, and/or analyzing a simulation signal, a testing unit for connecting the control system, and a connecting device, for example, a busbar or a bus system. Busbars are known from the conventional art, which have an electrical conductor, which is separated from another electrical conductor by an insulator, for example, an insulating plastic and/or a air gap. In this regard, the busbar can be a component of a printed circuit board, whereby a printed electrical trace of the printed circuit board, on the one hand, is surrounded in part by plastic and, on the other, is isolated from other electrical conductors in part by an air gap.

A disadvantage in such devices is that the parasitic property of the busbar or of the bus system interferes with and/or changes the simulation signals. In other words, the parasitic property of the busbar or the bus system brings about a corruption of the simulation, therefore ultimately a faulty control system test. The test results can be corrupted in this respect and lead to incorrect results.

SUMMARY OF THE INVENTION

It is therefore an object of the present invention to provide a device for testing an electrical component, which provides improved test results.

This object is achieved in an embodiment by a device for testing an electrical component, having a simulation device for generating a simulation signal, a testing device for connecting the electrical component, at least two connecting devices, and a selection device for selecting the connecting device, whereby the simulation device and the testing device can be connected in an electrically conducting manner to at least one of the connecting devices by means of the selection device and whereby the individual connecting devices differ from one another in at least one electrical property.

According to an embodiment of the invention, a device for testing the electrical component, for example, a control system of a motor vehicle or an automation device, is provided, in which the connecting device, connectable to the simulation device in an electrically conducting manner, is selected from a plurality of connecting devices. In this respect, the individual connecting devices have electrical properties different from one another. In other words, it is provided that based on the different electrical properties the individual connecting devices have different parasitic properties, whereby a signal corruption due to the parasitic property depends in many cases also on the simulation signal generated by the simulation device. Signal corruptions due to the parasitic property are understood to be, for example, unwanted changes of the simulation signal due to leakage current, capacitances, inductances, or power losses, for example, due to a property of an electrical conductor and/or its insulation. The parasitic property of a connecting device include in particular also an insufficient dielectric strength or an insufficient proof voltage of the connecting device, whereby the dielectric strength or proof voltage of the connecting device depends substantially on the insulation material and substance, and/or the insulator geometry, therefore, for example, the thickness of an insulator surrounding the electrical conductor.

The invention therefore enables connecting the simulation device and the testing device to a "simulation signal-specific" connecting device by means of the selection device, which can be made, for example, as a switch, in such a way that the signal corruption due to the parasitic property of the connecting device for the simulation signal generated by the simulation device is especially low. In this respect, different types of simulation signals can be assigned to different connecting devices, whereby the particular connecting device during supplying with the particular simulation signal causes only minor or no changes or disruptions in the simulation signal. It is achieved thereby, that the test results become more accurate, because unwanted effects due to the parasitic property of the connecting devices are reduced. Preferably, the selection of the connecting device occurs by means of the selection device based on at least one predefinable parameter, such as, for example, based on a table, based on a measurement, and/or based on a computer program.

In this connection, an embodiment of the invention provides that the electrical property of at least one of the connecting devices is selected in such a way that the signal corruption due to a parasitic property of the connecting device is minimized for a particular simulation signal. The electrical properties of all connecting devices can be selected in such a way that the signal corruption due to the parasitic property of a particular connecting device is minimized for a particular simulation signal. In other words, therefore, different "signal classes" of simulation signals can be assigned to different connecting devices, so that the noise components arising due to the parasitic properties of the connecting devices are reduced, preferably minimized, for the particular simulation signal.

The simulation signal can basically be any signal, therefore, for example, any analog or digital electrical signal. According to another embodiment of the invention, the simulation signal, however, is a current, a voltage, a time course of the current, and/or a time course of the voltage. The current and/or the voltage can have a resistive component, a capacitive component, an inductive component, and/or a frequency component. In this regard, the value of the current, voltage, the resistive component, the capacitive component, the inductive component, and/or of the frequency component is adjustable and/or can have, for example, a pulse shape or other shapes known from the state of the art with, for example, a time dependence. Further, a signal corruption can be expressed as a corruption of the voltage, current, and/or the time course of the simulation signal. A dielectric breakdown or spark formation, which is caused by an unwanted flowing away of the signal, for example, to a neighboring metallic housing part or to a neighboring connecting device, can be regarded as another type of signal corruption.

The simulation signal can be a short-circuit signal. A short-circuit signal can be impressed, for example, by controlled generation and/or simulation of a short circuit between a connecting device, a supply line, and/or a neutral conductor or zero conductor or between a first connecting device and a second connecting device, in each case, for example, within a defined time period.

Furthermore, the electrical property of at least one of the connecting devices can be selected in such a way that the signal corruption due to the parasitic property of the connecting device is smaller at a higher current than at a lower current or is smaller at a lower current than at a higher current and/or the electrical property of at least one of the connecting devices is selected such that the signal corruption due to the parasitic property of the connecting device is smaller at a lower voltage than at a higher voltage or is smaller at a higher voltage than at a lower voltage. Thus, for example, the electrical property of at least one of the connecting devices can be selected in such a way that the signal corruption due to the parasitic property of the connecting device is smaller at a higher current than at a lower current. In other words, the parasitic property of a connecting device can be adjusted, particularly optimized, depending on the simulation signal, as a result of which, therefore, for example, for a predefined simulation signal the connecting device can be selected for which the signal corruption due to the parasitic property is low. The test results during testing of an electrical component can be improved by a selection of this type of connecting device.

Basically, any number of connecting devices can be provided. According to an embodiment of the invention, at least two connecting devices are provided and the electrical property of the first connecting device and the second connecting device is selected in such a way that at a high current the signal corruption due to the parasitic property of the first connecting device is smaller than the signal corruption due to the parasitic property of the second connecting device or at a low current the signal corruption due to the parasitic property of the first connecting device is greater than the signal corruption due to the parasitic property of the second connecting device and/or at a high voltage the signal corruption due to the parasitic property of the first connecting device is smaller than the signal corruption due to the parasitic property of the second connecting device or at a low voltage the signal corruption due to the parasitic property of the first connecting device is greater than the signal corruption due to the parasitic property of the second connecting device. In other words, for example, the electrical properties of the first connecting device and the second connecting device are selected in such a way that at a high current the signal corruption due to the parasitic property of the first connecting device is smaller than the signal corruption due to the parasitic property of the second connecting device. According to this example, therefore, more accurate test results can be achieved with the use of the first connecting device, because the signal corruption due to the parasitic property, which has an interfering or modifying effect on the simulation signal, at a high current is smaller for the first connecting device than for the second connecting device. Accordingly, the accuracy in tests of electrical components can be increased by the invention in a simple way by the use of a plurality of connecting devices each with electrical properties different from one another.

According to a further embodiment of the invention, at least three connecting devices are provided. The electrical property of the first connecting device can be selected in such a way that the signal corruption due to the parasitic property of the first connecting device is smaller at a higher current than at a lower current. The electrical property of the second connecting device is selected in such a way that the signal corruption due to the parasitic property of the second connecting device is smaller at a lower current than at a higher current, and the electrical property of the third connecting device is selected in such a way that the signal corruption due to the parasitic property of the third connecting device is smaller at a higher voltage than at a lower voltage. According to this embodiment, three connecting devices are provided, whereby the three connecting devices are optimized with respect to the electrical property for high currents, low currents, and high voltages as simulation signals. In other words, for a high current, a low current, and/or a high voltage, the connecting device can be selected, for which the signal corruption due to the parasitic property for the particular simulation signal is low.

In the embodiments according to the invention, a high current can be understood to be a current that can range, for example, from more than 1 Ampere to 100 Amperes, a low current can be understood to be a current that can range, for example, from 0 Amperes to 1 Ampere. Likewise, a high voltage can be a voltage that is greater than, for example, 200 volts, 400 volts, or 4000 volts, and a low voltage can be a voltage that is less than, for example, 120 volts, 60 volts, or 30 volts. It is noted that these ranges are not exhaustive, but are being provided for explanation purposes.

Basically, there are different approaches to define the electrical property of a connecting device. According to an embodiment of the invention, it is provided, however, that the electrical property is determined by the transmission line constants of the connecting device and the transmission line constants are determined particularly by the resistance per unit length, the leakage per unit length, the capacitance per unit length, and/or the inductance per unit length of the connecting device.

In the previously described embodiment with the three connecting devices, the resistance per unit length of the first connecting device can be $\geq 0.1$ m$\Omega$/m to $\leq 25$ m$\Omega$/m, preferably $\geq 0.5$ m$\Omega$/m to $\leq 4$ m$\Omega$/m, and very especially preferably $\geq 1$ m$\Omega$/m to $\leq 2$ m$\Omega$/m, and the resistance per unit length of the second connecting device is $\geq 25$ m$\Omega$/m to $\leq 1500$ m$\Omega$/m, preferably $\geq 50$ m$\Omega$/m to $\leq 400$ m$\Omega$/m, and very especially preferably $\geq 100$ m$\Omega$/m to $\leq 200$ m$\Omega$/m. It is preferred furthermore that the resistance per unit length of the third connecting device is $\geq 1$ m$\Omega$/m to $\leq 80$ m$\Omega$/m, preferably $\geq 5$ m$\Omega$/m to $\leq 40$ m$\Omega$/m, and very especially preferably $\geq 10$ m$\Omega$/m to $\leq 20$ m$\Omega$/m.

Again based on the previously described embodiment with three connecting devices, the capacitance of the first connecting device can be $\geq 2$ nF to $\leq 400$ nF, preferably $\geq 5$ nF to $\leq 200$ nF, and very especially preferably $\geq 10$ nF to $\leq 100$ nF; and the capacitance of the second connecting device can be $\geq 20$ pF to $\leq 4$ nF, preferably $\geq 50$ pF to $\leq 2$ nF, and very especially preferably $\geq 100$ pF to $\leq 1$ nF.

An object of the invention further is that the simulation device and the testing device can be connected in an electrically conducting manner to the same connecting device by means of the selection device. It is preferred further that the simulation device and the testing device can be connected in an electrically conducting manner to a plurality of similar connecting devices by means of the selection device. The connection to a plurality of similar connecting devices is advantageous, for example, when the simulation signal has both a high current and a high voltage. In a case of this type, on one hand, the parasitic property of a connecting device can be minimized by an optimal selection of the connecting device and simultaneously the electrotechnical requirements, for example, with respect to the dielectric strength, can be fulfilled, if these requirements cannot be fulfilled by a single connecting device alone.

An object of the invention further is that the simulation device can be designed in such a way that simulation signals can be generated for different operating states of the electrical component and particularly simulation signals can be generated for faulty operating states of the electrical component. In other words, the simulation signals, on the one hand, simulate normal operating states occurring during real operation, and on the other hand, simulate operating states, for example, disruptions or the like, that occur rarely during real operation. In this connection, the simulation device comprises a "failure insertion unit," abbreviated FIU. Such simulation signals in particular that represent non-normal, therefore faulty operating states can be generated by the failure insertion unit. Hence, according to the device of the invention, an electrical component can be tested not only with respect to normal operation, but also with respect to different error and/or faulty states.

The testing device can be designed basically as desired. According to an embodiment of the invention, it is provided, the testing device has a connection for a sensor, an actuator, and/or an electrical control device. For example, the sensor can be made as an original sensor of a motor vehicle, such as a rain sensor, and the actuator, for example, as an original load, for example, as an electromechanical power steering system, therefore as an "electric power-assisted steering system" or EPAS system, particularly comprising a program-controlled electric servo-motor. Further, the testing device can be designed as part of an I/O device. I/O devices include in particular devices of this type with analog and digital input and output channels, devices with intelligent signal processing for preprocessing and postprocessing of raw data, other data, data bus modules, devices for signal coding, or, for example, modules for controlling actuators, therefore actuators particularly in terms of control elements within a controlled system.

The connecting device can also be designed basically as desired. According to another embodiment of the invention, it is provided, that the connecting device can be realized as a busbar or as a bus system and the busbar can have at least two electrical conductors. The busbar can comprise 2, 3, 5, 10, or 20 electrical conductors. To this end, many different designs for busbars and/or bus systems are known from the state of the art.

According to an embodiment of the invention, the simulation device and the testing device can be connected by means of the selection device in an electrically conducting manner to at least one of the connecting devices, the selection of the connecting device can be made by means of the selection device preferably depending on the simulation signal, and the selection device is realized preferably as a relay, as a semiconductor switch, and/or as a combination of relay and semiconductor switch. The semiconductor switch can be realized as a transistor, thyristor, or IGBT. It is preferable, furthermore, that the parasitic capacitance of the connecting device, particularly the capacitance per unit length of the connecting device, can be influenced by the semiconductor switch. Likewise, the switching device can be realized as any switch known from the conventional art, whereby the person skilled in the art will undertake a dimensioning of the relay, the semiconductor switch, and/or the selector switch preferably with respect to the designated simulation signals. By a design of this type, the simulation device and the testing device can be connected in a very simple way in an electrically conducting manner to at least one of the connecting devices by means of the selection device. It is preferred further that the selection device comprises a means for detecting the signal class of the simulation signal, such as, for example, high voltage, high current, low voltage, or low current. In this connection, it is preferred further that the selection device depending on the signal class detected by the selection device selects a suitable connecting device of this type, whose signal corruption due to the parasitic property for the simulation signal is low, preferably zero. The simulation device can comprise the selection device. In other words, the selection device can be a component of the simulation device.

The electrical component can be designed basically as desired. According to an embodiment of the invention, it is provided, that the electrical component can be designed as an electrical control device and the electrical control device is designed particularly as an electrical control device of a motor vehicle, a rail vehicle, a flying object, and/or an automation device. Such electrical control devices are frequently called an "electronic control unit," abbreviated as ECU, particularly an automotive ECU. The term "electrical" component and "electrical" control device does not preclude that apart from electrical, particularly electronic, elements, for example, also optical elements and/or opto-electronic elements are included in the electrical component or in the electrical control device.

Further, the device of the invention can be used for testing an electrical component for hardware-in-the-loop, abbreviated HIL, simulation. The phrase "hardware-in-the-loop simulation" can be used in particular for a simulation method in which a system to be tested for example, an embedded system, such as an ECU, and a simulator, often called an HIL simulator, interact. In this regard, preferably the system to be tested and the simulator in each case exchange the signals via inputs and outputs, which the system to be tested exchanges in a later development phase in similar way with the then present technical environment, the "real environment," for example, a vehicle or a production machine. Depending on the testing requirements, it may be sufficient for a test to check only parts of the communication of the electrical component to be tested with its technical environment. In this case, consequently an HIL simulator used for the test may not provide all of the simulation signals of the later real environment. The signals necessary for the test, in contrast, are to be provided in practice in many cases by the HIL simulator unaltered or in a realistic way.

The accuracy of an HIL simulation can be improved by the device of the invention, because the parasitic properties of the connecting devices can be minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the single FIGURE shows a device for testing an electrical component according to an exemplary embodiment of the invention in a schematic illustration.

DETAILED DESCRIPTION

A device for testing an electrical component, such as, for example, a control system for a motor vehicle or an automation device, according to a preferred exemplary embodiment of the invention, can be seen in a schematic illustration in the FIGURE. The device has a simulation device 1, a testing device 2, and three connecting devices 3, 4, 5.

A simulation signal, with which an error-free and/or a faulty operating state of the electrical component can be simulated, can be generated by simulation device 1. The simulation signal can have a current and/or a voltage, whereby in addition a resistive component, a capacitive component, an inductive component, and/or a frequency component can be present in the current and/or in the voltage. In the present case, simulation device 1 comprises a failure insertion unit, abbreviated as FIU. Further, the simulation signal can be a short circuit, as is indicated by line 6.

Testing device 2 is used to connect the electrical component (not shown). In this regard, testing device 2 can have a sensor, a sensor system, an actuator, and/or an actuator system. In the present example, testing device 2 can be realized as an actuator system, and connected to an electrical control device of a motor vehicle (not shown).

As is evident further from the FIGURE, simulation device 1 and testing device 2 can be connected in an electrically conducting manner with at least one of the connecting devices 3, 4, 5. The electrically conducting connection of simulation device 1 and testing device 2 to the first connecting devices 3 is indicated by line 7. Further, the electrically conducting connection of simulation device 1 with second connecting device 4 is indicated by dashed line 8.

It is preferred in this regard that simulation device 1 and testing device 2 are connected in an electrically conducting manner to the same connecting device 3, as shown in the FIGURE. A selection device can be provided (not shown), which can be realized as a relay, for the electrically conducting connection of simulation device 1 and testing device 2 to at least one of the connecting devices 3, 4, 5.

Connecting devices 3, 4, 5 in the present case are each realized as a busbar with two electrical conductors 9. In this case, the electrical properties of the individual connecting devices 3, 4, 5 are designed in such a way that they differ from one another.

In the present case, the first connecting device 3 can be supplied with a current up to 100 A, the second connecting device can be supplied with a current up to 1 A, and the third connecting device 5 can be supplied with a voltage up to 250 V. Accordingly, the electrical property, therefore, for example, the transmission line constants such as resistance per unit length, leakage per unit length, capacitance per unit length, and/or inductance per unit length, of the individual connecting devices 3, 4, 5 are selected in such a way that the signal corruption due to the parasitic property during impression of a high current as a simulation signal on the first connecting device 1 is minimized, the signal corruption due to the parasitic property during impression of a low current on the second connecting device 4 is minimized, and the signal corruption due to the parasitic property during impression of a high voltage on the third connecting device 5 is minimized.

It is provided in the present example that the proof voltage is designed in such a way that in the presence of the maximum signal voltage values given below in a normal office environment (normal humidity, temperature, etc., in office rooms), the insulating action of the electrical insulation of the connecting device is maintained. In other words, the particular connecting devices are designed for selectable uses in such a way that the breakdown voltage is not reached in the selected use of the connecting device. Breakdown voltage within the scope of the invention is taken to mean the electrical voltage that is necessary to allow a current to flow through an insulator (for example, plastics, porcelain, or air). If the breakdown voltage is reached or exceeded, then an electrical breakdown occurs, whereby, as is well-known, an electrical breakdown between spaced-apart electrical conductors, separated by an air gap, proceeds with spark formation. An electrical breakdown in a semiconductor chip at a p-n junction, poled in blocking direction, as a rule does not proceed with spark formation in the semiconductor, but when the breakdown voltage is exceeded, for example, a so-called "avalanche breakdown" or a "Zener breakdown" occurs.

In a previously described embodiment with three connecting devices, it is accordingly preferred, that the value of the breakdown voltage of the first and second connecting device is over 30 V, preferably over 60 V, and very especially preferably over 120 V; that the value of the breakdown voltage of the third connecting device is over 200 V, preferably over 400 V, and very especially preferably over 4000 V.

The electrical property of the first connecting device 3 and the electrical property of the second connecting device 4 are selected in such a way that at a high current the signal corruption due to the parasitic property of the first connecting device 3 is smaller than the signal corruption due to the parasitic property of the second connecting device 4. Likewise, at a low current the signal corruption due to the parasitic property of the first connecting device 3 is greater than the signal corruption due to the parasitic property of the second connecting device 4. A similar analogy applies to the third connecting device 5, which is optimized, for example, for a high voltage, and with respect to another connecting device, for example, a fourth connecting device (not shown), which is optimized in reference the electrical property for a low voltage.

In principle, the simulation signals, which can be switched for testing the electrical component to the connecting device 3, 4, 5 by the simulation device 1, are disrupted or changed due to the parasitic property of the connecting devices 3, 4, 5. Unwanted disturbances, signal changes and/or signal corruptions due to such parasitic properties can be reduced by selection of a "simulation-specific" connecting device 3, 4, 5. According to the preferred exemplary embodiment of the invention, the signal corruption due to the parasitic property of the connecting device 3, 4, 5 at a low current as a simulation signal can be minimized by the use of the second connecting device 4.

As a result, a device for testing an electrical component is provided with which in a simple manner the testing accuracy can be increased by minimizing the signal corruption due to the parasitic property of the connecting devices 3, 4, 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for testing an electrical component, the device comprising:
   a simulation device configured to generate a simulation signal;
   a testing device configured to connect to the electrical component;
   at least two connecting devices; and
   a selection device for selecting a connecting device of the at least two connecting devices,
   wherein the simulation device and the testing device are connectable in an electrically conducting manner to at least one of the connecting devices via the selection device, and
   wherein the individual connecting devices, in each case, differ from one another in at least one electrical property.

2. The device according to claim 1, wherein the electrical property of at least one of the connecting devices is selected such that a signal corruption due to a parasitic property of the connecting device is minimized for a particular simulation signal.

3. The device according to claim 1, wherein the simulation signal is a current, a voltage, a time course of the current, or a time course of the voltage.

4. The device according to claim 1, wherein the electrical property of at least one of the connecting devices is selected such that signal corruption due to a parasitic property of the connecting device is smaller at a higher current than at a lower current or is smaller at a lower current than at a higher current or wherein the electrical property of at least one of the connecting devices is selected such that the signal corruption due to the parasitic property of the connecting device is smaller at a lower voltage than at a higher voltage or is smaller at a higher voltage than at a lower voltage.

5. The device according to claim 1, wherein electrical properties of a first connecting device and a second connecting device are selected such that at a high current the signal corruption due to a parasitic property of the first connecting device is smaller than the signal corruption due to a parasitic property of the second connecting device or such that at a low current the signal corruption due to the parasitic property of the first connecting device is greater than the signal corruption due to the parasitic property of the second connecting device or such that at a high voltage the signal corruption due to the parasitic property of the first connecting device is smaller than the signal corruption due to the parasitic property of the second connecting device or such that at a low voltage the signal corruption due to the parasitic property of the first connecting device is greater than the signal corruption due to the parasitic property of the second connecting device.

6. The device according to claim 1, wherein at least three connecting devices are provided, the electrical property of the first connecting device is selected such that the signal corruption due to a parasitic property of the first connecting device is smaller at a higher current than at a lower current, wherein the electrical property of the second connecting device is selected such that the signal corruption due to a parasitic property of the second connecting device is smaller at a lower current than at a higher current, and wherein the electrical property of the third connecting device is selected such that the signal corruption due to a parasitic property of the third connecting device is smaller at a higher voltage than at a lower voltage.

7. The device according to claim 1, wherein the electrical property is determined by transmission line constants of the connecting device, and wherein the transmission line constants are determined by a resistance per unit length, a leakage per unit length, a capacitance per unit length, and/or an inductance per unit length of the connecting device.

8. The device according to claim 1, wherein the simulation device and the testing device are connectable in an electrically conducting manner to the same connecting device via the selection device.

9. The device according to claim 1, wherein the simulation device is configured such that simulation signals are generated for different operating states of the electrical component and wherein simulation signals are generated for faulty operating states of the electrical component.

10. The device according to claim 1, wherein the simulation device comprises a failure insertion unit.

11. The device according to claim 1, wherein the testing device has a connection for a sensor, an actuator, and/or an electrical control device.

12. The device according to claim 1, wherein the connecting device of the at least two connecting devices is configured as a busbar and wherein the busbar has at least two electrical conductors.

13. The device according to claim 1, wherein the simulation device and the testing device are connectable via the selection device in an electrically conducting manner to at least one of the connecting devices, wherein the selection of the connecting device is made via the selection device based on the simulation signal, and wherein the selection device is a relay, a semiconductor switch, or a combination of the relay and the semiconductor switch.

14. The device according to claim 1, wherein the electrical component is an electrical control device, and wherein the electrical control device is configured as an electrical control device of a motor vehicle, a rail vehicle, a flying object, and/or an automation device.

15. The device according to claim 1, wherein the device is a component for hardware-in-the-loop simulation.

16. The device according to claim 3, wherein the time course of the current is a frequency of the current, and wherein time course of the voltage is a frequency of the voltage.

* * * * *